United States Patent
Oso et al.

(10) Patent No.: US 12,085,010 B2
(45) Date of Patent: Sep. 10, 2024

(54) ELECTRONIC FUEL INJECTION TYPE DIESEL ENGINE

(71) Applicant: KUBOTA Corporation, Osaka (JP)

(72) Inventors: Hiroki Oso, Osaka (JP); Yuki Tagashira, Osaka (JP); Akira Tamura, Osaka (JP); Rina Kaneko, Osaka (JP); Kiichi Suehiro, Sakai (JP)

(73) Assignee: KUBOTA CORPORATION, Osaka (JP)

(*) Notice: Subject to any disclaimer, the term of this patent is extended or adjusted under 35 U.S.C. 154(b) by 0 days.

(21) Appl. No.: 18/266,586

(22) PCT Filed: Oct. 25, 2021

(86) PCT No.: PCT/JP2021/039248
§ 371 (c)(1),
(2) Date: Jun. 9, 2023

(87) PCT Pub. No.: WO2022/145119
PCT Pub. Date: Jul. 7, 2022

(65) Prior Publication Data
US 2024/0044283 A1 Feb. 8, 2024

(30) Foreign Application Priority Data

Dec. 28, 2020 (JP) ................. 2020-218646

(51) Int. Cl.
*F02B 19/18* (2006.01)
*F01P 1/10* (2006.01)
(Continued)

(52) U.S. Cl.
CPC .............. *F02B 19/18* (2013.01); *F01P 1/10* (2013.01); *F02F 11/002* (2013.01); *F02M 61/14* (2013.01)

(58) Field of Classification Search
CPC ........... F02B 19/18; F01P 1/10; F02F 11/002; F02M 61/14; F02M 2200/858
See application file for complete search history.

(56) References Cited

U.S. PATENT DOCUMENTS

| | | | |
|---|---|---|---|
| 6,289,868 B1 * | 9/2001 | Jayne | ...................... H01T 13/50 |
| | | | 123/260 |
| 6,883,490 B2 * | 4/2005 | Jayne | ...................... F02M 57/00 |
| | | | 123/297 |
| 11,519,322 B1 * | 12/2022 | McDavid | ................ F02B 19/12 |

FOREIGN PATENT DOCUMENTS

| | | |
|---|---|---|
| JP | 52-154518 U | 11/1977 |
| JP | 59-115861 U | 8/1984 |

(Continued)

OTHER PUBLICATIONS

International Search Report issued Dec. 28, 2021 in PCT/JP2021/039248.

(Continued)

*Primary Examiner* — Xiao En Mo
(74) *Attorney, Agent, or Firm* — Panitch Schwarze Belisario & Nadel LLP

(57) ABSTRACT

Provided is an electronic fuel injection type diesel engine capable of performing precise electronic fuel injection control. A fuel injector includes a main body portion having a large diameter, a nozzle portion having a small diameter, and a pressing surface formed at a step portion between the main body portion and the nozzle portion, in which the nozzle portion of the fuel injector is inserted from an inside of a sleeve into an inside of an insertion hole, the fuel injector is pressed toward a vortex chamber by a pressing force, and the pressing force applied to the fuel injector is received by a pressure receiving surface of the sleeve from the pressing surface of the fuel injector via the washer.

20 Claims, 15 Drawing Sheets

(51) Int. Cl.
    *F02F 11/00* (2006.01)
    *F02M 61/14* (2006.01)

(56) References Cited

FOREIGN PATENT DOCUMENTS

| | | |
|---|---|---|
| JP | 2005-059950 A | 3/2005 |
| JP | 2009-501291 A | 1/2009 |
| JP | 2013-068125 A | 4/2013 |
| JP | 2020067065 A | 4/2020 |
| WO | 2007009839 A1 | 1/2007 |

OTHER PUBLICATIONS

JP Decision of Dismissal of Amendment issued Mar. 17, 2023 in JP 2020-218646.
Office Action issued Mar. 17, 2023 in JP 2020-218646.
Office Action issued Dec. 23, 2022 in JP 2020-218646.
Office Action issued Aug. 23, 2022 in JP 2020-218646.

* cited by examiner

Sleeve (A) Basic example (B) Modification 1

Structure such as pressure receiving surface of sleeve (A) Basic example
(only flat surface)

(B) Modification 3-1
(concentric circular groove)

(C) Modification 3-2
(spiral groove)

Sealing structure of pressure receiving surface of sleeve (A) Modification 4-1 (O-ring)

(B) Modification 4-2 (X-ring)

(C) Modification 4-3 (triangular ring)

(D) Modification 4-4 (elastic end portion)

Waterproof/dustproof structure on outer peripheral side of washer

Combination of basic example and modification of each part of engine (A) Basic example
(combination example of
basic examples of
respective parts)

(B) Modification 8
(combination example of
modifications 4-4 and 7-1)

ELECTRONIC FUEL INJECTION TYPE DIESEL ENGINE

CROSS-REFERENCE TO RELATED APPLICATIONS

This application is a Section 371 of International Application No PCT/JP2021/039248, filed Oct. 25, 2021, which was published in the Japanese language on Jul. 7, 2022, under International Publication No. WO 2022/145119 A1, which claims priority under 35 U.S.C. § 119(b) to Japanese Application No. 2020-218646, filed Dec. 28, 2020, the disclosures of each of which are incorporated herein by reference.

TECHNICAL FIELD

The present invention relates to an electronic fuel injection type diesel engine, and more particularly to an electronic fuel injection type diesel engine capable of performing precise electronic fuel injection control.

BACKGROUND ART

A conventional electronic fuel injection type diesel engine includes a vortex chamber type combustion chamber, an insertion hole in a cylinder head toward the vortex chamber, and an electronic fuel injection type fuel injector inserted into the insertion hole (see, for example, Patent Document 1).

PRIOR ART DOCUMENT

Patent Document

Patent Document 1: Japanese Patent Application Laid-open No. 2020-67065 (see FIG. 1)

SUMMARY OF THE INVENTION

Problems to be Solved by the Invention

«Problems» It may not be possible to perform precise electronic fuel injection control.

In the engine of Patent Document 1, when a main body portion of the fuel injector is disposed in the cylinder head, electronic components in the fuel injector main body portion are overheated by heat of the cylinder head, and precise electronic fuel injection control may not be performed.

An object of the present invention is to provide an electronic fuel injection type diesel engine capable of performing precise electronic fuel injection control.

Solutions to the Problems

A main configuration of the invention of the present application is as follows.

As shown in FIG. 1(A), in an electronic fuel injection type diesel engine including a cylinder (3), a cylinder head (1), a vortex chamber (2) in the cylinder head (1), a main combustion chamber (4) in the cylinder (3), a communication port (5) for communicating the main combustion chamber (4) and the vortex chamber (2), an insertion hole (Ta) in the cylinder head (1) toward the vortex chamber (2), and an electronic fuel injection type fuel injector (7) inserted into the insertion hole (T a), as shown in FIG. 1(A), the electronic fuel injection type diesel engine including: a sleeve (10) protruding from the insertion hole (Ta) to an outside of the cylinder head (1); and a pressure receiving surface (10b) provided at a protruding end portion (10a) of the sleeve (10), in which the fuel injector (7) includes a main body portion (7c) having a large diameter, a nozzle portion (7d) having a small diameter, and a pressing surface (7e) formed at a step portion between the main body portion (7c) and the nozzle portion (7d), and in which the nozzle portion (7d) of the fuel injector (7) is inserted from an inside of the sleeve (10) to an inside of the insertion hole (Ta), the fuel injector (7) is pressed toward the vortex chamber (2) by a pressing force (11), and the pressing force (11) applied to the fuel injector (7) is received by the pressure receiving surface (10b) of the sleeve (10) from the pressing surface (7e) of the fuel injector (7) via a washer (12).

Effects of the Invention

The invention of the present application has the following effects.

«Effects» It is possible to perform precise electronic fuel injection control.

As shown in FIG. 1(A), in this engine, the main body portion (7c) of the fuel injector (7) is moved away from the cylinder head (1) by the sleeve (10), and the electronic components in the main body portion (7c) of the fuel injector (7) are hardly overheated by the heat of the cylinder head (1), so that precise electronic fuel injection control can be performed.

BRIEF DESCRIPTION OF THE DRAWINGS

FIG. 1 is a view relating to a basic example of each part of an engine used in a diesel engine according to an embodiment of the present invention, in which FIG. 1(A) is an elevation cross-sectional view of a vortex chamber and a peripheral portion thereof, FIG. 1(B) is an enlarged view as viewed in a direction of arrow B in FIG. 1(A), FIG. 1(C) is an enlarged view as viewed in a direction of arrow C in FIG. 1(A), and FIG. 1(D) is an enlarged view as viewed in a direction of arrow D in FIG. 1(A).

FIG. 2 is a view relating to a sleeve used in the engine of FIG. 1, wherein FIG. 2(A) shows a basic example, and FIG. 2(B) shows Modification 1.

FIG. 3 is a view relating to a sealing structure of a pressure receiving surface of the sleeve used in the engine of FIG. 1, in which FIG. 3(A) shows a basic example, FIG. 3(B) shows Modification 2-1, FIG. 3(C) shows Modification 2-2, and FIG. 3(D) shows Modification 2-3.

FIG. 4 is a view relating to a structure such as the pressure receiving surface of the sleeve used in the engine of FIG. 1, in which FIG. 4(A) shows a basic example, FIG. 4(B) shows Modification 3-1, and FIG. 4(C) shows Modification 3-2.

FIG. 5 is a view relating to a sealing structure of the pressure receiving surface of the sleeve used in the engine of FIG. 1, in which FIG. 5(A) shows Modification 4-1, FIG. 5(B) shows Modification 4-2, FIG. 5(C) shows Modification 4-3, and FIG. 5(D) shows Modification 4-4.

FIG. 6 is a view relating to a sealing structure on an inner peripheral side of the sleeve used in the engine of FIG. 1, in which FIG. 6(A) shows a basic example, FIG. 6(B) shows Modification 5-1, FIG. 6(C) shows Modification 5-2, FIG. 6(D) shows Modification 5-3, FIG. 6(E) shows Modification 5-4, and FIG. 6(F) shows Modification 5-5.

FIG. 7 is a view relating to the sealing structure on the inner peripheral side of the sleeve used in the engine of FIG. 1, in which FIG. 7(A) shows Modification 5-6 and FIG. 7(B) shows Modification 5-7.

FIG. 8 is a view relating to the sealing structure of the outer periphery of the sleeve used in the engine of FIG. 1, in which FIG. 8(A) shows a basic example, FIG. 8(B) shows Modification 6-1, FIG. 8(C) shows Modification 6-2, and FIG. 8(D) shows Modification 6-3.

FIG. 9 is a view relating to a waterproof/dustproof structure of an outer periphery of a washer used in the engine of FIG. 1, in which FIG. 9(A) shows a basic example, FIG. 9(B) shows Modification 7-1, and FIG. 9(C) shows Modification 7-2.

FIG. 10 is a view relating to a combination example of a basic example and a modification of each part of the engine used in the engine of FIG. 1, in which FIG. 10(A) shows a basic example and FIG. 10(B) shows Modification 8.

FIG. 11 is a view showing a basic example relating to a fuel injection hole of a fuel injector used in the engine of FIG. 1, in which FIG. 11(A) is a cross-sectional view taken along line XIA-XIA of FIG. 1(B), FIG. 11(B) is a view corresponding to FIG. 1(B), and FIG. 11(C) is a view corresponding to FIG. 1(C).

FIG. 12 is a view relating to Modification 9 of the fuel injection hole of the fuel injector used in the engine of FIG. 1, in which FIG. 12(A) is a view corresponding to FIG. 11(A), FIG. 12(B) is a view corresponding to FIG. 11(B), and FIG. 12(C) is a view corresponding to FIG. 11(C).

FIG. 15(B) is a view corresponding to FIG. 11(B), and FIG. 15(C) is a view corresponding to FIG. 11(C).

EMBODIMENT OF THE INVENTION

Figure 1:
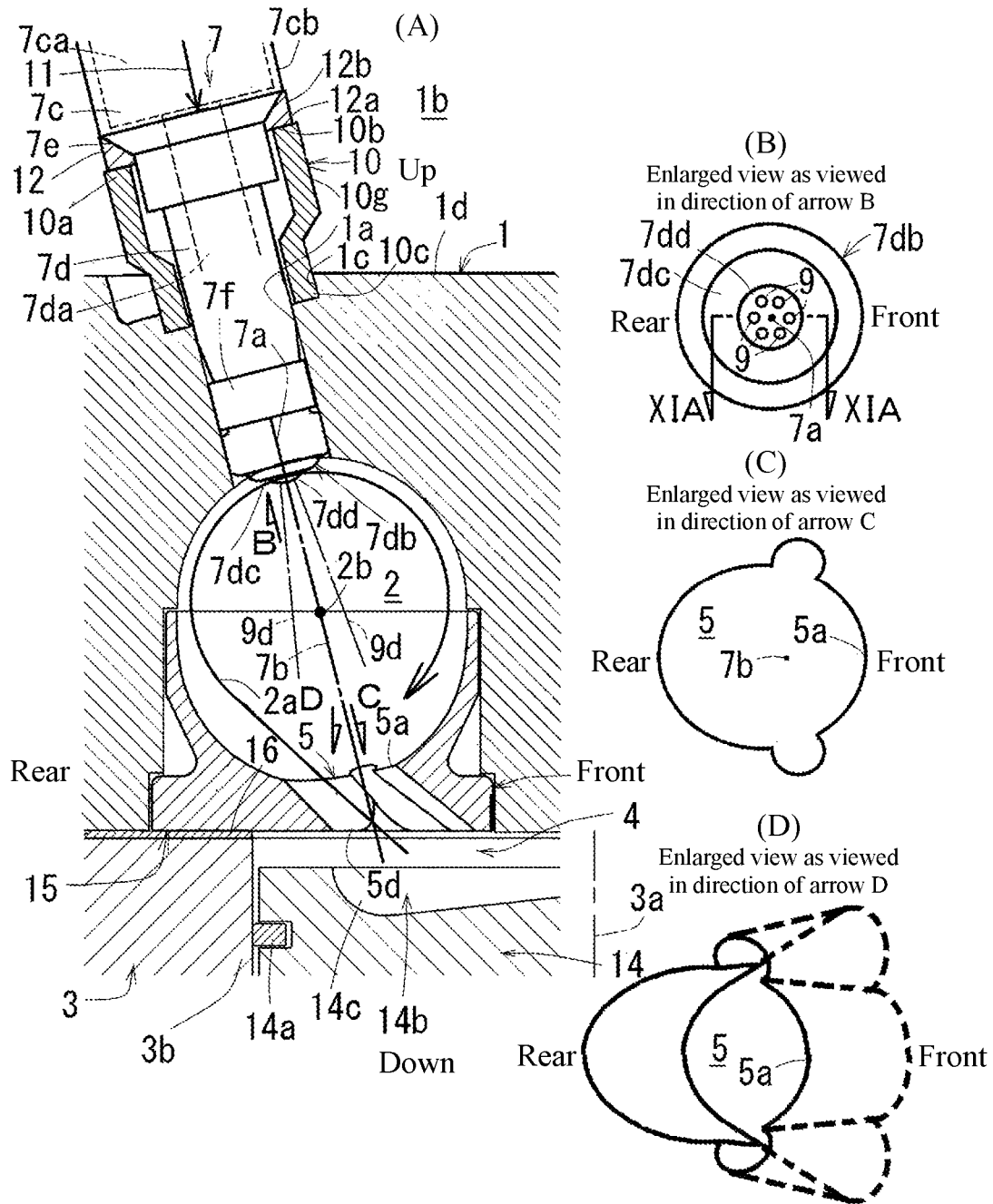
Figure 2:
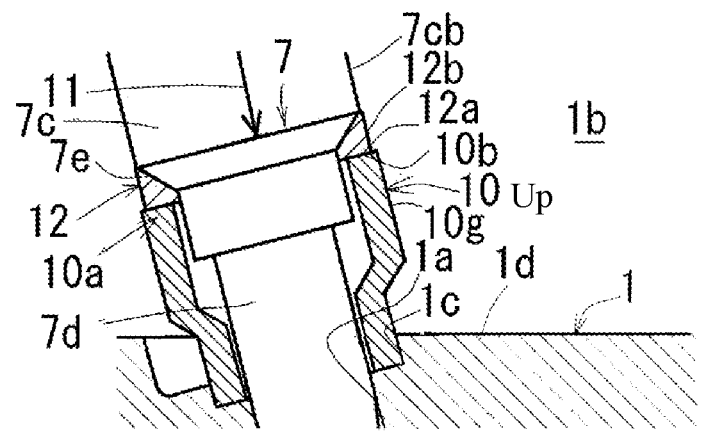
Figure 2:
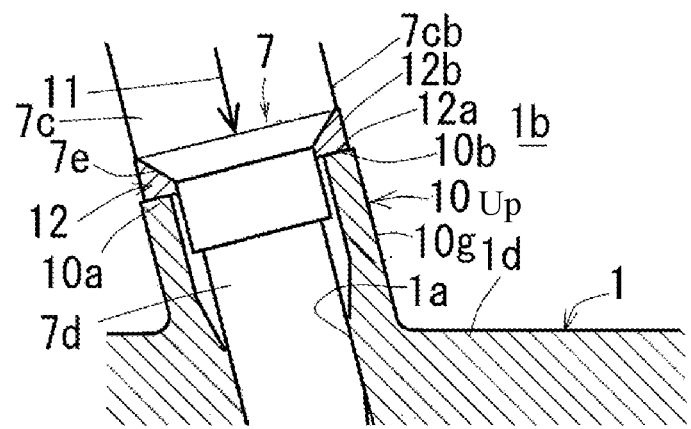
Figure 3:
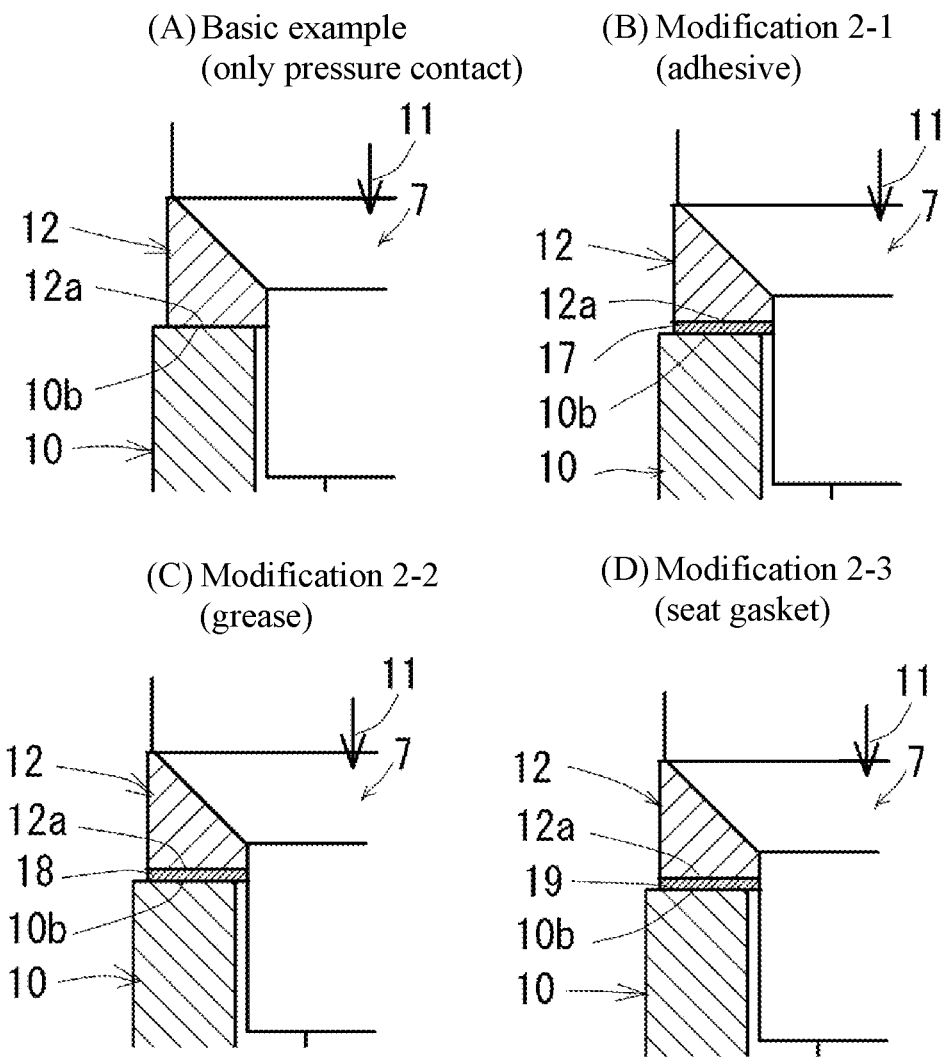
Figure 4:
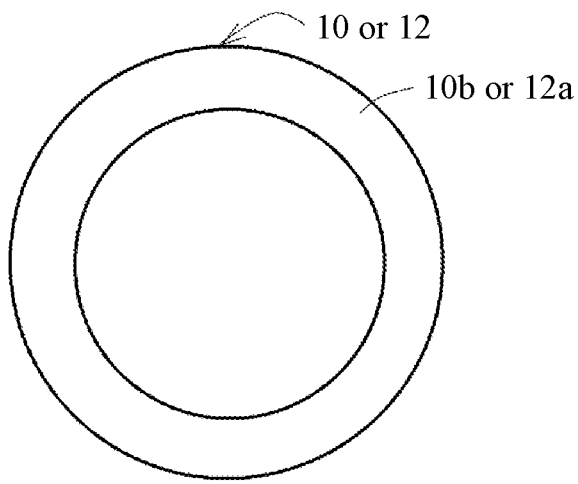
Figure 4:
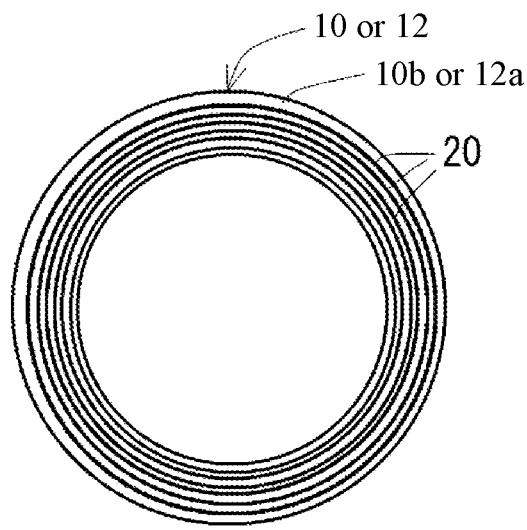
Figure 4:
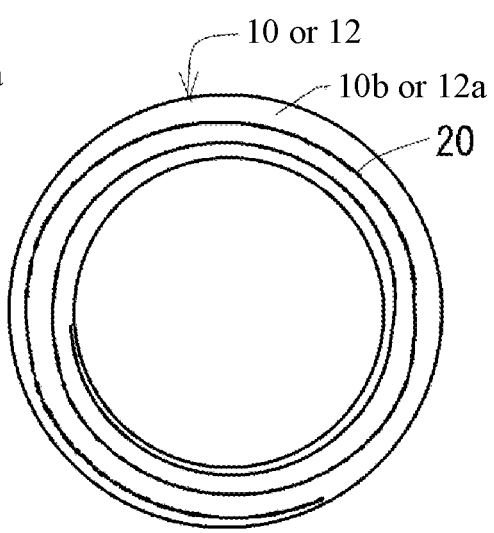
Figure 5:
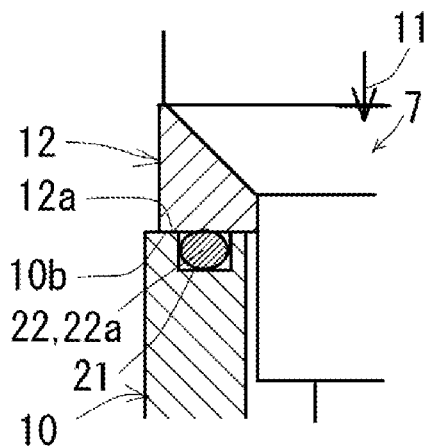
Figure 5:
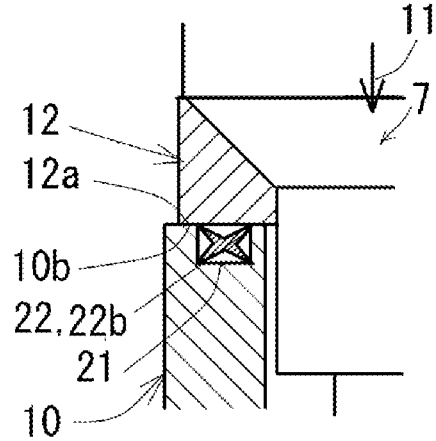
Figure 5:
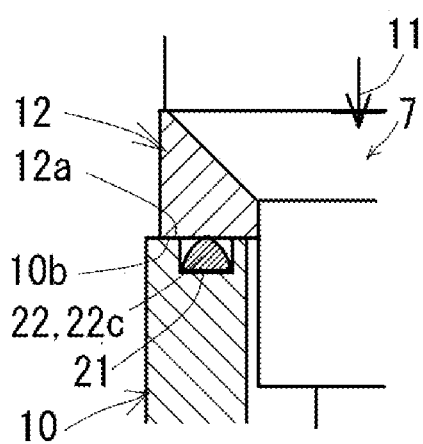
Figure 5:
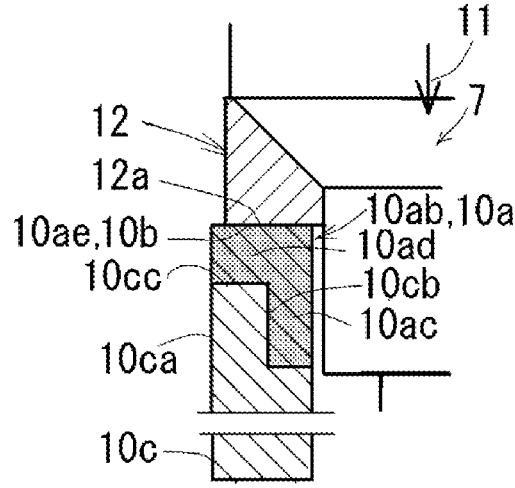
Figure 6:
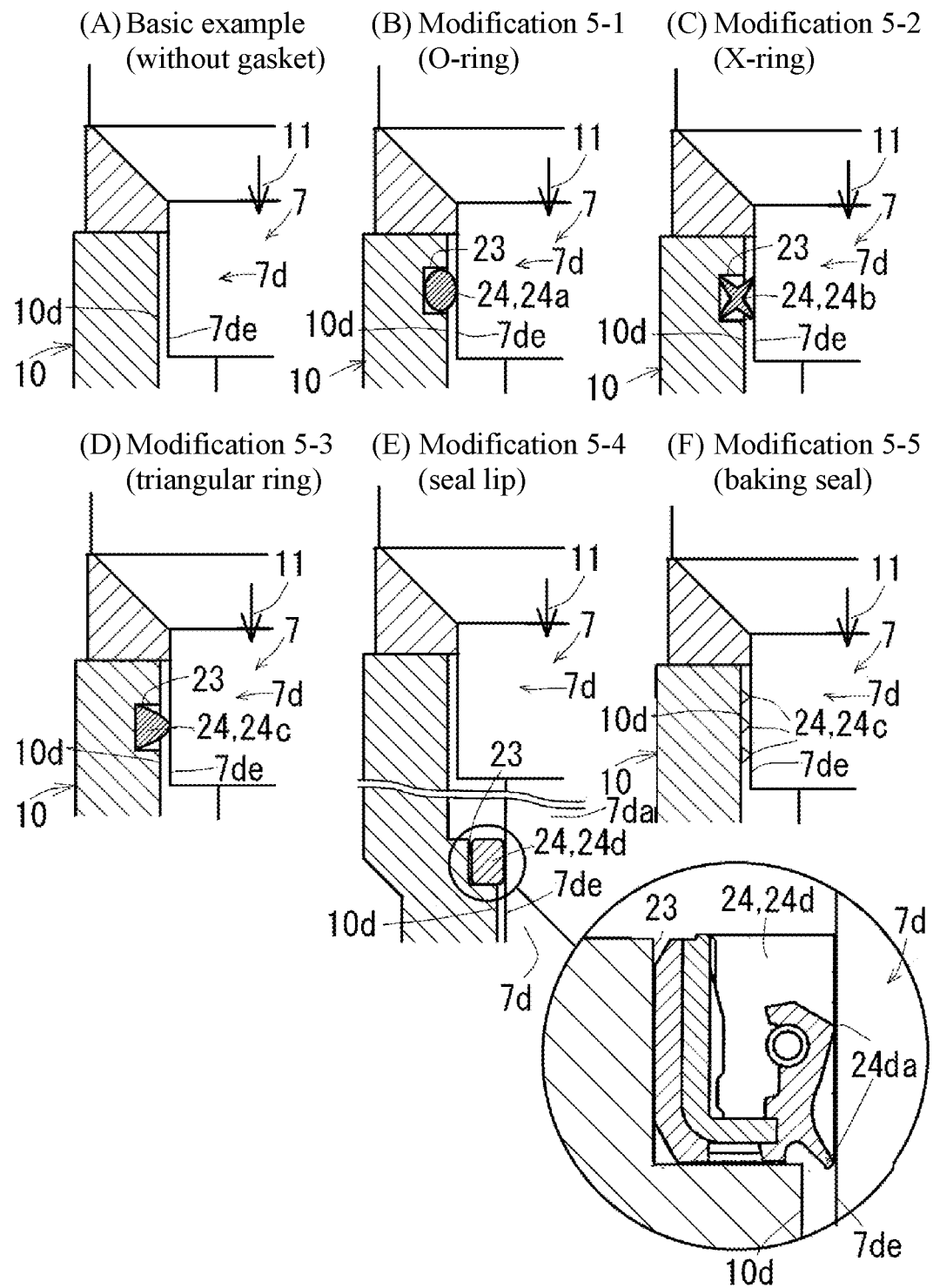
Figure 7:
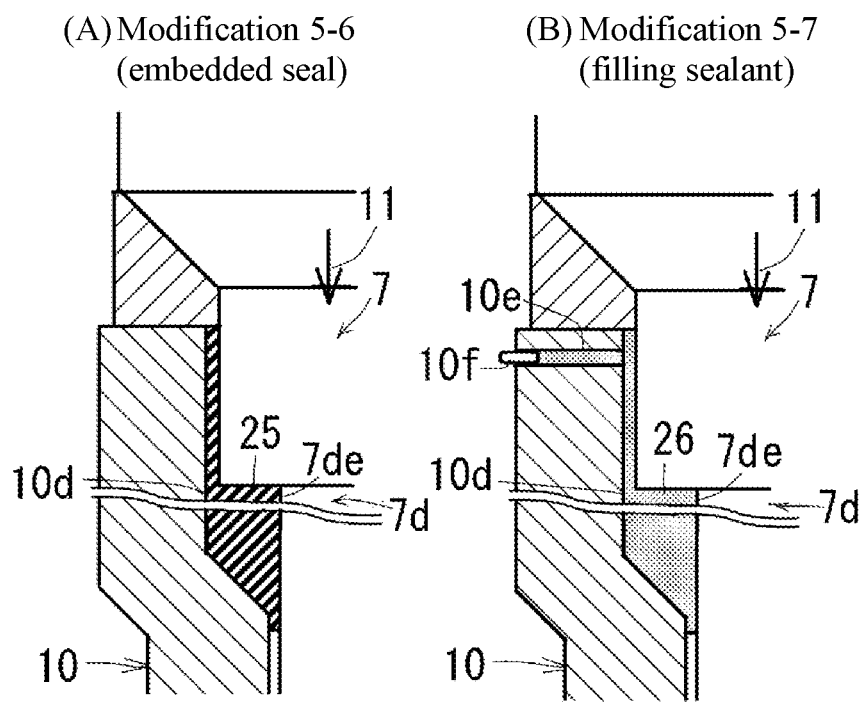
Figure 8:
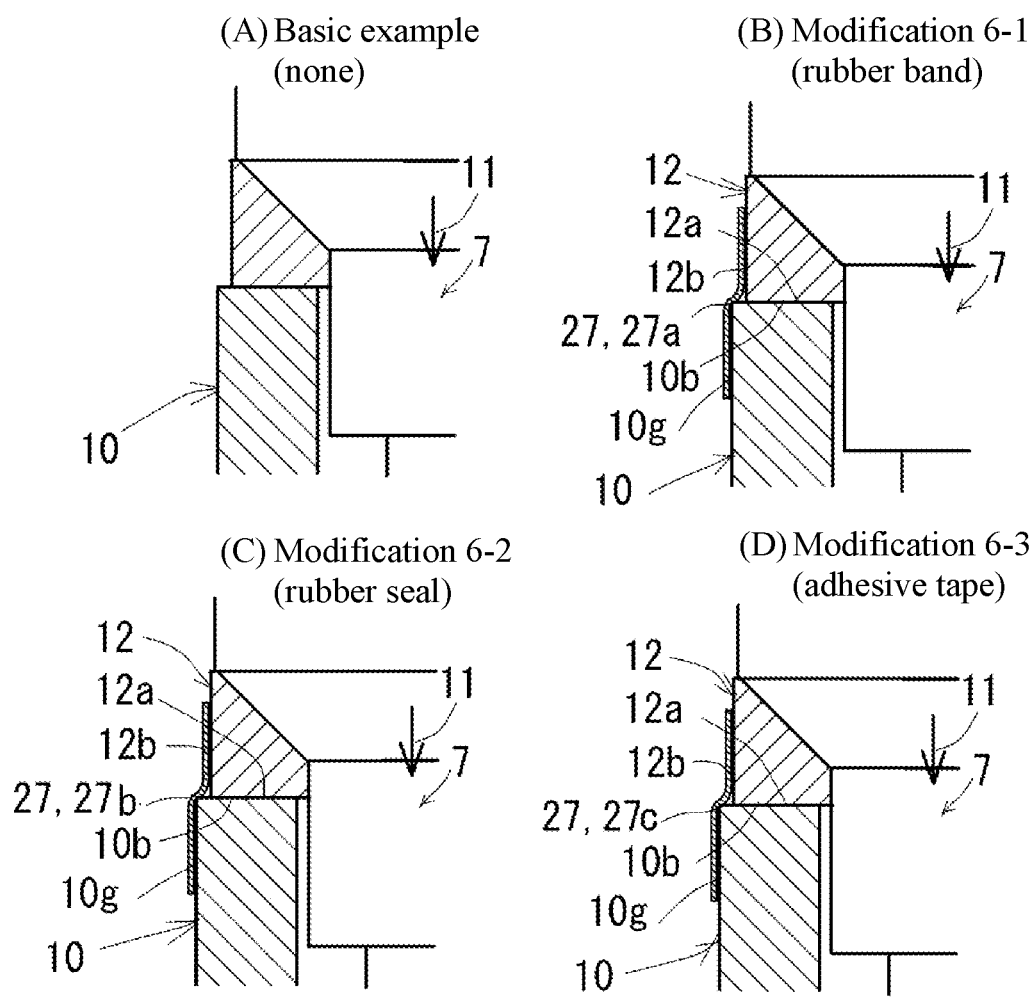
Figure 9:
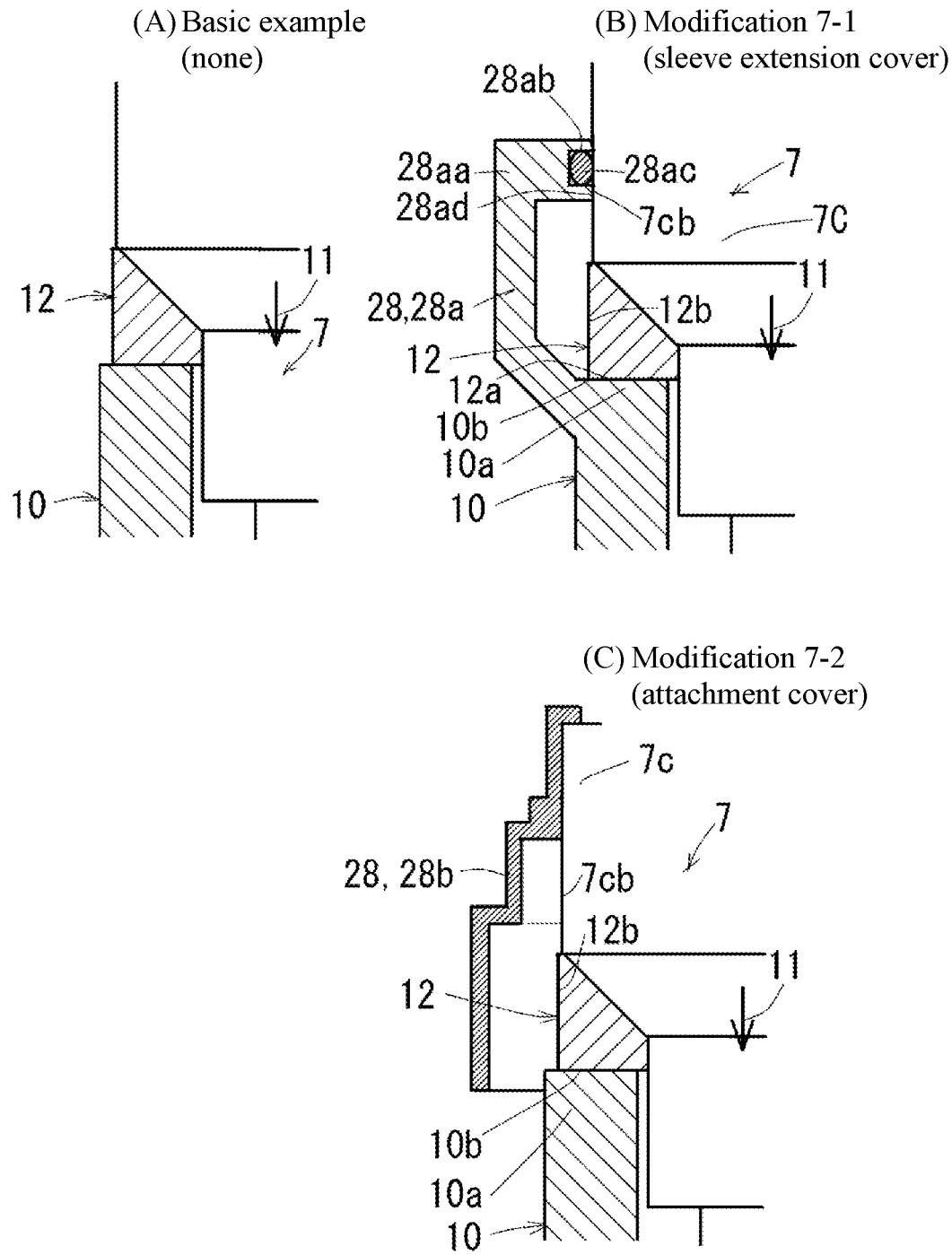
Figure 10:
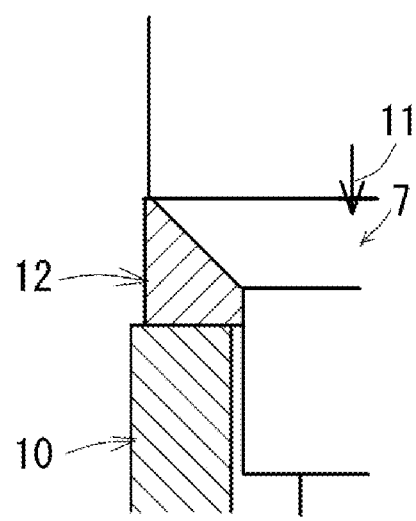
Figure 10:
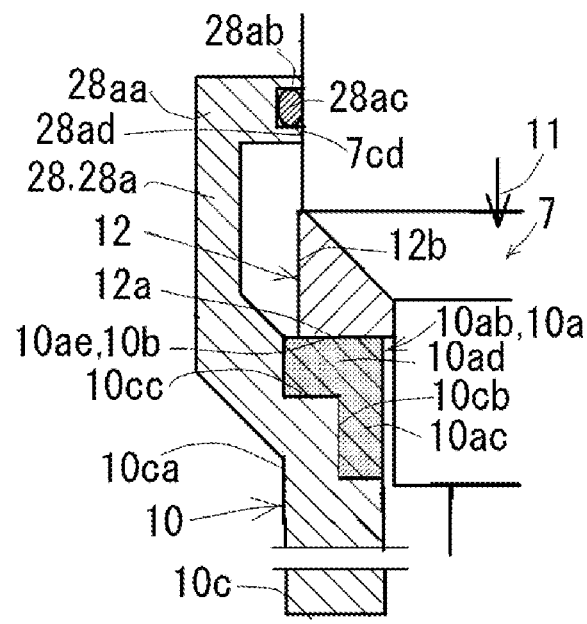

FIGS. 1 to 12 are views showing a diesel engine according to an embodiment of the present invention, FIG. 1 is a basic example relating to each part of an engine used in an engine of the embodiment, and FIGS. 2 to 12 are basic examples and modifications relating to a sleeve, a sealing structure, and the like used in the embodiment.

Figure 13:
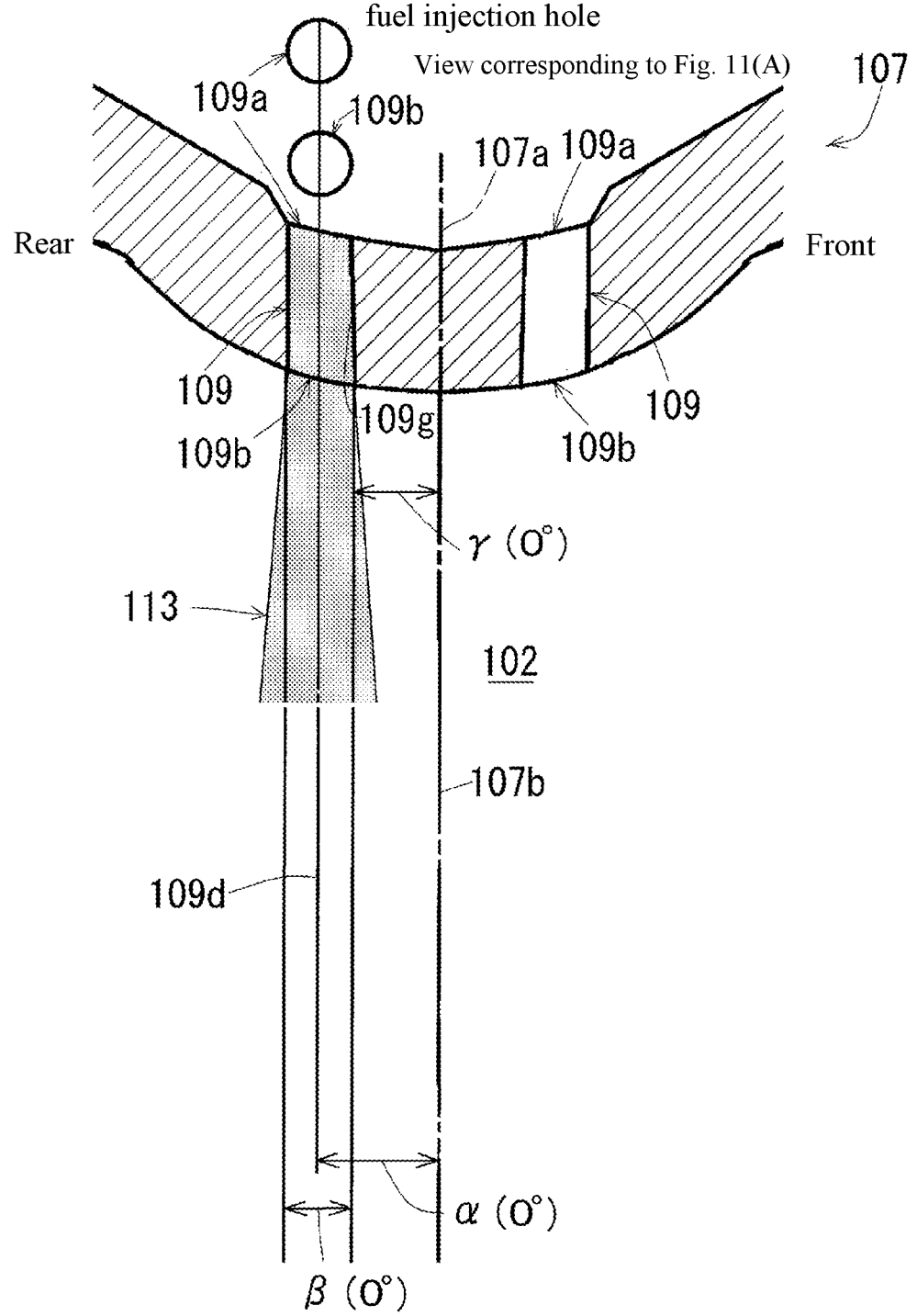
FIG. 13 is a view corresponding to FIG. 11(A) relating to a first comparative example of the fuel injection hole of the fuel injector.
Figure 14:
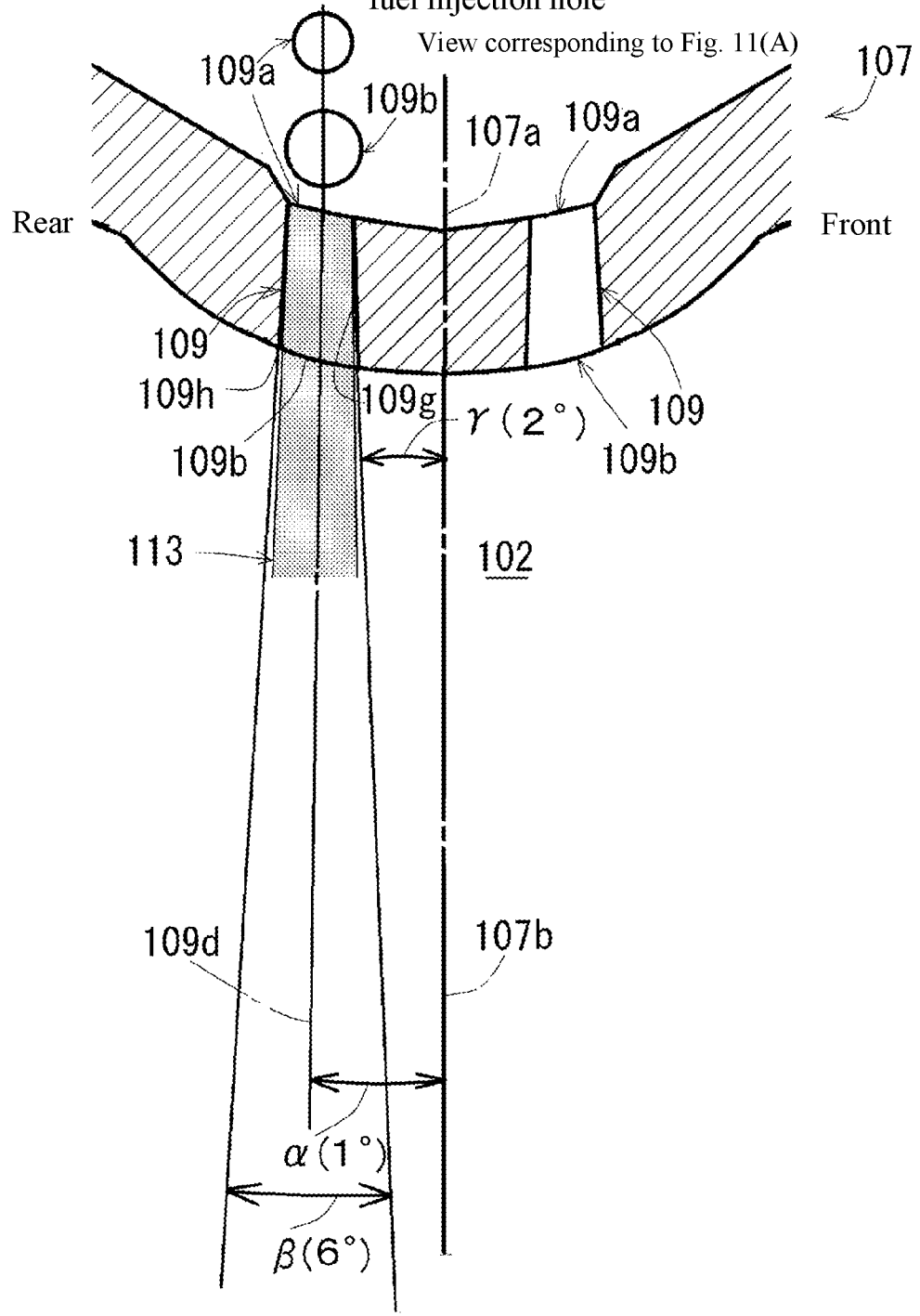
FIG. 14 is a view corresponding to FIG. 11(A) relating to a second comparative example of the fuel injection hole of the fuel injector.
Figure 15:
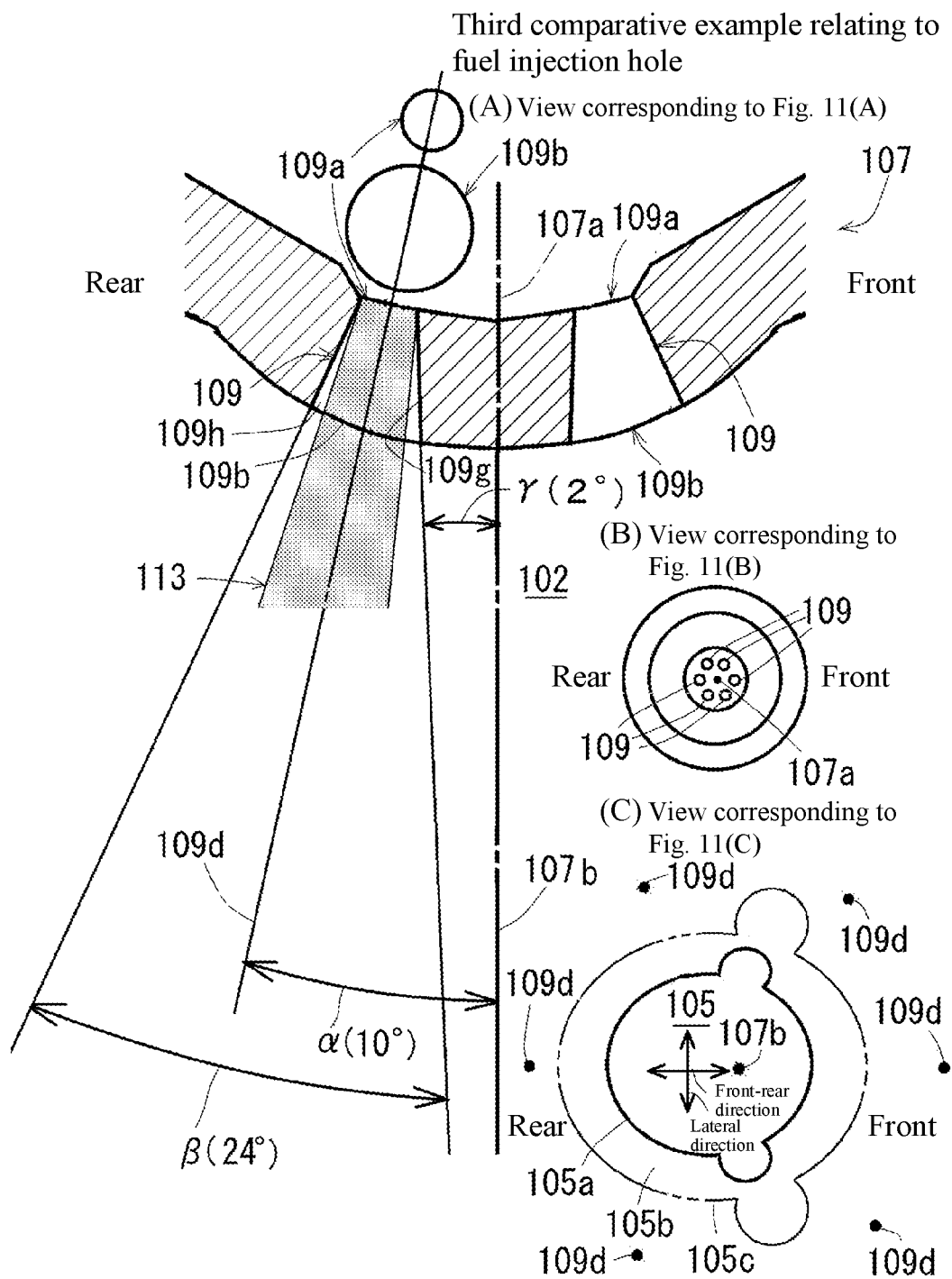
FIG. 15 is a view relating to a third comparative example of the fuel injection hole of the fuel injector, in which 15(A) is a view corresponding to FIG. 11(A)

FIGS. 13 to 15 are views of comparative examples relating to fuel injection holes.

In the embodiment of the present invention shown in FIG. 1, an electronic fuel injection type diesel engine of an upright series multi-cylinder is used.

As shown in FIG. 1(A), the engine includes a cylinder (3), a cylinder head (1) assembled to an upper portion of the cylinder (3), and a piston (14) internally fitted to the cylinder (3).

As shown in FIG. 1(A), this engine includes a vortex chamber (2) in the cylinder head (1), a main combustion chamber (4) in the cylinder (3), a communication port (5) for communicating the main combustion chamber (4) and the vortex chamber (2), an insertion hole (1a) in the cylinder head (1) toward the vortex chamber (2), and an electronic fuel injection type fuel injector (7) inserted into the insertion hole (1a).

This engine is a four-cycle engine. In this engine, compressed air is pushed into the vortex chamber (2) from the main combustion chamber (4) via the communication port (5) near a top dead center of a compression stroke, an injected fuel (13) shown in FIG. 11(A) is injected from the fuel injector (7) into a swirl flow (2a) of the compressed air generated in the vortex chamber (2), a combustion gas generated by combustion in the vortex chamber (2) is injected from the communication port (5) shown in FIG. 1(A) into the main combustion chamber (4), and unburned fuel contained in the combustion gas is mixed with air in the main combustion chamber (4) and combusted.

The electronic fuel injection type fuel injector (7) is electronically controlled by an engine ECU, and a predetermined amount of the injected fuel (13) is injected at a predetermined timing.

The ECU is an abbreviation of an electronic control unit.

As shown in FIG. 1(A), a piston ring (14a) is externally fitted to the piston (14), and a gas guide groove (14b) that gradually becomes shallower toward the front side is provided on the upper surface of the piston (14) with the cylinder central axis line (3a) side as the front side and the cylinder peripheral wall (3b) side as the rear side.

The vortex chamber (2) has a spherical shape and is formed in the cylinder head (1). Reference numeral (2b) in FIG. 1(A) is the center of the vortex chamber (2).

The communication port (5) is formed in a ferrule (15) internally fitted to the cylinder head (1), and is directed toward the vortex chamber (2) obliquely backward and upward from the main combustion chamber (4). An opening (5d) of the communication port (5) on the main combustion chamber (4) side is disposed directly above a rear end portion (14c) of the gas guide groove (14b).

The main combustion chamber (4) is formed by a space vertically sandwiched between the cylinder head (1) and the piston (14) in the cylinder (3).

A head gasket (16) is sandwiched between the cylinder (3) and the cylinder head (1) and the ferrule (15).

As shown in FIG. 1(A), the engine includes a sleeve (10) protruding from the insertion hole (1a) to the outside of the cylinder head (1), and a pressure receiving surface (10b) provided on a protruding end portion (10a) of the sleeve (10).

As shown in FIG. 1(A), the fuel injector (7) includes a main body portion (7c) having a large diameter, a nozzle portion (7d) having a small diameter, and a pressing surface (7e) formed at a step portion between the main body portion (7c) and the nozzle portion (7d).

In this engine, the nozzle portion (7d) of the fuel injector (7) is inserted from the inside of the sleeve (10) to the inside of the insertion hole (1a), the fuel injector (7) is pressed toward the vortex chamber (2) by a pressing force (11), and the pressing force (11) applied to the fuel injector (7) is received by the pressure receiving surface (10b) of the sleeve (10) from the pressing surface (7e) of the fuel injector (7) via a washer (12).

As shown in FIG. 1(A), in this engine, the main body portion (7c) of the fuel injector (7) is moved away from the cylinder head (1) by the sleeve (10), and the electronic components in the main body portion (7c) of the fuel injector (7) are hardly overheated by the heat of the cylinder head (1), so that precise electronic fuel injection control can be performed.

In this engine, the pressing force (11) applied to the fuel injector (7) is generated when the fuel injector (7) receives an elastic restoring force of a compressed spring plate (not shown).

As shown in FIG. 1(A), a gas seal (7f) is externally fitted to the nozzle portion (7d), an inner peripheral surface of the insertion hole (1a) and an outer peripheral surface of the nozzle portion (7d) are sealed by the gas seal (7f), and a combustion gas generated in the vortex chamber (2) is prevented from leaking outside through the insertion hole (1a).

As shown in FIG. 1(A), in this engine, a valve body (7da) is housed in the nozzle portion (7d) of the fuel injector (7), and electronic components of a valve actuator (7ca) of the valve body (7da) are housed in the main body portion (7c) of the fuel injector (7).

Therefore, in this engine, the electronic components of the valve actuator (7ca) in the main body portion (7c) are hardly overheated by the heat of the cylinder head (1), so that precise electronic fuel injection control can be performed.

Examples of the electronic components of the valve actuator (7ca) include an electromagnetic coil of an electronic solenoid, a piezoelectric element, and the like.

As shown in FIG. 1(A), the engine includes an engine cooling air passage (1b), and an outer peripheral surface (7cb) of the main body portion (7c) of the fuel injector (7) and an outer peripheral surface (10g) of the sleeve (10) are exposed in the engine cooling air passage (1b).

In this engine, the heat of the main body portion (7c) of the fuel injector (7) and the sleeve (10) is dissipated by cooling air passing through the engine cooling air passage (1b), and the main body portion (7c) of the fuel injector (7) is hardly overheated by the heat of the cylinder head (1), so that precise electronic fuel injection control can be performed.

Engine cooling air generated by an engine cooling fan (not shown) passes through the engine cooling air passage (1b) during engine operation.

In the engine of FIG. 1(A), a basic example of the sleeve (10) shown in FIG. 2(A) is used, and the sleeve (10) of this basic example is configured as a component separate from the cylinder head (1) and is attached to the cylinder head (1).

For this reason, in this engine, the heat transfer from the cylinder head (1) to the sleeve (10) is hindered at the attachment location of the sleeve (10), and the electronic components in the main body portion (7c) of the fuel injector (7) are hardly overheated by the heat of the cylinder head (1), so that precise electronic fuel injection control can be performed.

In addition, when the sleeve (10) of this basic example is used, the shape of the cylinder head (1) becomes simple and the manufacturing of the cylinder head (1) becomes easy as compared with the case of using the sleeve (10) of Modification 1 shown in FIG. 2(B) described later, that is, the sleeve (10) integrated with the cylinder head (1).

In the engine of FIG. 1(A), the cylinder head (1) includes a fitting hole (1c) provided in the outer opening portion of the insertion hole (1a), and a base end portion (10c) of the sleeve (10) is internally fitted to the fitting hole (1c).

The base end portion (10c) of the sleeve (10) is fixed to the fitting hole (1c) by press fitting.

The base end portion (10c) of the sleeve (10) may be fixed to the fitting hole (1c) by any one of press fitting, adhesion, welding, press fitting and adhesion, and press fitting and welding. An adhesive is used for adhesion.

In this engine, the material of the cylinder head (1) can be cast iron, and the material of the sleeve (10) can be steel. The cylinder head (1) may be die-cast aluminum, and the material of the sleeve (10) may be aluminum or another metal. A heat-resistant resin may be used for the sleeve (10). The material of the cylinder head (1) and the material of the sleeve (10) may be the same or different.

As in Modification 1 shown in FIG. 2(B), the sleeve (10) may be an integrally molded product with the cylinder head (1).

The use of the sleeve (10) of Modification 1 shown in FIG. 2(B) has an advantage that the number of parts can be reduced as compared with the case of using the sleeve (10) of the basic example shown in FIG. 2(A), that is, the sleeve (10) as a component separate from the cylinder head (1).

Other configurations and functions of Modification 2 of FIG. 2(B) are the same as those of the basic example of FIG. 2(A) unless there is a particular contradiction. In FIG. 2(B), the same elements as those in FIG. 2(A) are denoted by the same reference numerals as those in FIG. 2(A).

In the engine shown in FIG. 1(A), the basic example shown in FIG. 3(A) is used for the sealing structure of the pressure receiving surface (10b) of the sleeve (10).

As shown in FIG. 3(A), in this basic example, a space between a pressing surface (12a) of the washer (12) and the pressure receiving surface (10b) of the sleeve (10) is sealed only by pressure contact by the pressing force (11).

In the sealing structure of the pressure receiving surface (10b) of the sleeve (10), as in Modification 2-1 shown in FIG. 3(B), a space between the pressing surface (12a) of the washer (12) and the pressure receiving surface (10b) of the sleeve (10) may be sealed with an adhesive (17).

When Modification 2-1 is used, the sealing by pressure contact is strengthened by the adhesive (17), and the sealing property is enhanced.

In this case, water or dust hardly enters the sleeve (10) from between the pressing surface (12a) of the washer (12) and the pressure receiving surface (10b) of the sleeve (10). Water and dust that has entered the sleeve (10) enter the fuel injector (7) and cause its failure. In addition, the water that has entered the sleeve (10) before baking coating of the engine is vaporized by the heat during the baking coating to swell the coating film from the inside, which causes peeling.

In the sealing structure of the pressure receiving surface (10b) of the sleeve (10), as in Modification 2-2 shown in FIG. 3(C), a space between the pressing surface (12a) of the washer (12) and the pressure receiving surface (10b) of the sleeve (10) may be sealed with grease (18).

According to Modification 2-2, the sealing by pressure contact is strengthened by the grease (18), and the sealing property is enhanced.

In the sealing structure of the pressure receiving surface (10b) of the sleeve (10), as in Modification 2-3 shown in FIG. 3(C), a space between the pressing surface (12a) of the washer (12) and the pressure receiving surface (10b) of the sleeve (10) may be sealed with a seat gasket (19).

When this Modification 2-3 is used, the sealing by pressure contact is strengthened by the seat gasket (19), and the sealing property is improved.

Materials such as metal, resin, and rubber can be used for the seat gasket (19).

In the engine of FIG. 1(A), the basic example shown in FIG. 4(A) is used for the pressing surface (12a) of the washer (12) and the pressure receiving surface (10b) of the sleeve (10).

In the basic example shown in FIG. 4(A), both the pressure receiving surface (10b) of the sleeve (10) and the pressing surface (12a) of the washer (12) are formed only of flat surfaces.

In the pressing surface (12a) of the washer (12) and the pressure receiving surface (10b) of the sleeve (10), as in Modification 3-1 and Modification 3-2 shown in FIGS. 4(B) and 4(C), concentric circular or spiral grooves (20) extending in the circumferential direction are formed in both or one of the pressure receiving surface (10b) of the sleeve (10) and the pressing surface (12a) of the washer (12).

In Modification 3-1 shown in FIG. 4(B), the concentric circular grooves (20) are formed, and in Modification 3-2 shown in FIG. 4(B), the spiral grooves (20) are formed.

When Modification 3-1 or Modification 3-2 is used, the contact pressure is increased by an amount by which the pressure contact area between the pressing surface (12a) of the washer (12) and the pressure receiving surface (10b) of the sleeve (10) is reduced by the grooves (20), and the sealing property is enhanced.

Further, even if water or dust enters the groove (20), the water or dust moves in the circumferential direction along the groove (20), and thus hardly enters the sleeve (10).

The sealing structure of the pressure receiving surface (10b) of the sleeve (10) may use a ring gasket (22) internally fitted to a ring groove (21) recessed in the pressure receiving surface (10b) of the sleeve (10) as in Modifications 4-1 to 4-3 shown in FIGS. 5(A) to 5(C).

As the ring gasket (22), an O-ring (22a) is used in Modification 4-1 shown in FIG. 5(A), an X-ring (22b) having an X-shaped cross section is used in Modification 4-2 shown in FIG. 5(B), and a triangular ring (22 c) having a triangular cross section is used in Modification 4-3 shown in FIG. 5(C).

When the ring gaskets (22) of Modifications 4-1 to 4-3 are used, sealing between the pressing surface (12a) of the washer (12) and the pressure receiving surface (10b) of the sleeve (10) can be reliably performed by the elastic restoring force of the ring gasket (22) that is less likely to be displaced in the ring groove (21).

The ring gasket (22) is made of rubber.

The sealing structure of the pressure receiving surface (10b) of the sleeve (10) may use an elastic end portion (10ab) as in Modification 4-4 shown in FIG. 5(D).

In Modification 4-4, the sleeve (10) includes the main body portion (10ca) on the base end portion (10c) side and the elastic end portion (10ab) constituting a part of the protruding end portion (10a), the elastic end portion (10ab) and the main body portion (10ca) are tightly fitted, the elastic end portion (10ab) is formed of a material having a smaller elastic coefficient (that is, easily elastically deformed) than the main body portion (10ca) and the washer (12), and the pressure receiving surface (10b) of the sleeve (10) is formed at the elastic end portion (10ab).

When the elastic end portion (10ab) of Modification 4-4 is used, sealing between the pressing surface (12a) of the washer (12) and the pressure receiving surface (10b) of the sleeve (10) can be reliably performed by the elastic restoring force of the elastic end portion (10ab) tightly fitted to the main body portion (10ca) and supported without positional displacement.

In this case, since the elastic end portion (10ab) functions as a gasket, a dedicated gasket for sealing the pressure receiving surface (10b) of the sleeve (10) becomes unnecessary.

As in Modifications 2-1 and 2-2 of FIGS. 3(B) and 3(C), a space between the pressing surface (12a) of the washer (12) and the pressure receiving surface (10b) of the sleeve (10) may be sealed with the adhesive (17) or the grease (18).

When the main body portion (10ca) and the washer (12) are made of steel, the elastic end portion (10ab) may be made of copper, aluminum, rubber, resin, or the like having an elastic coefficient smaller than that of steel.

In Modification 4-4, the elastic end portion (10ab) and the main body portion (10ca) are tightly fitted with a telescopic inlay structure.

That is, the main body portion (10ca) of the sleeve (10) includes a fitting groove (10cb) having a cross-sectional L-shaped inner surface at the opening peripheral edge on the elastic end portion (10ab) side, the elastic end portion (10ab) includes a cylindrical portion (10ac) tightly fitted with a fitting groove (10cb) and a flange portion (10ad) radially protruding from the cylindrical portion (10ac) along an opening end surface (10cc) of the main body portion (10ca) on the elastic end portion (10ab) side, and an opening end surface (10ae) of the flange portion (10ad) is the pressure receiving surface (10b) of the sleeve (10).

The inner peripheral side of the sleeve (10) of the engine of FIG. 1(A) does not have a gasket and does not have a sealing function as in the basic example of FIG. 6(A). However, in order to impart a sealing function to the inner peripheral side of the sleeve (10), as in Modifications 5-1 to 5-4 shown in FIGS. 6(B) to 6(E), a sealing structure using a ring gasket (24) internally fitted to a ring groove (23) recessed in the inner peripheral surface (10d) of the sleeve (10) may be used.

As the ring gasket (24), an O-ring (24a) is used in Modification 5-1 shown in FIG. 6(B), an X-ring (24b) having an X-shaped cross section is used in Modification 5-2 shown in FIG. 6(C), a triangular ring (24c) having a triangular cross section is used in Modification 5-3 shown in FIG. 6(D), and a seal lip ring (24d) is used in Modification 5-4 shown in FIG. 6(E). The seal lip ring (24d) includes a seal lip (24da) on an inner periphery.

The seal lip ring (24d) is press-fitted into the ring groove (23). The ring gasket (24) is in pressure contact with an outer peripheral surface (7de) of the nozzle portion (7d) of the fuel injector (7).

When the ring gaskets (22) of Modifications 5-1 to 5-4 are used, sealing between the inner peripheral surface (10d) of the sleeve (10) and the outer peripheral surface (7de) of the nozzle portion (7d) of the fuel injector (7) can be reliably performed by the elastic restoring force of the ring gasket (22) that is less likely to be displaced in the ring groove (21).

The sealing structure on the inner peripheral side of the sleeve (10) may use the ring gasket (24) fixed by baking to the inner peripheral surface (10d) of the sleeve (10) as in Modification 5-5 shown in FIG. 6(F).

In Modification 5-5 shown in FIG. 6(F), the triangular rings (24c) having a triangular cross section are used.

A plurality of the triangular rings (24c) is disposed in the axial length direction of the inner peripheral surface (10d) of the sleeve (10).

The triangular rings (24c) are in pressure contact with the outer peripheral surface (7de) of the nozzle portion (7d) of the fuel injector (7).

When the ring gasket (24) of Modification 5-5 is used, sealing between the inner peripheral surface (10d) of the sleeve (10) and the outer peripheral surface (7de) of the nozzle portion (7d) of the fuel injector (7) can be reliably performed by the elastic restoring force of the ring gasket (22) that is not displaced by baking.

The sealing structure on the inner peripheral side of the sleeve (10) may use an embedded seal (25) embedded between the inner peripheral surface (10d) of the sleeve (10) and the outer peripheral surface (7de) of the nozzle portion (7d) of the fuel injector (7) as in Modification 5-6 shown in FIG. 7(A).

The embedded seal (25) is in close contact with the inner peripheral surface (10d) of the sleeve (10) and the outer peripheral surface (7de) of the nozzle portion (7d) of the fuel injector (7).

As a material of the embedded seal (25), a resin such as rubber or acrylic can be used.

When the embedded seal (25) of Modification 5-6 is used, sealing between the inner peripheral surface (10d) of the sleeve (10) and the outer peripheral surface (7de) of the nozzle portion (7d) of the fuel injector (7) can be reliably performed with the embedded seal (25) that is not displaced by embedding.

The sealing structure on the inner peripheral side of the sleeve (10) may use a filling sealant (26) filled between the inner peripheral surface (10d) of the sleeve (10) and the outer peripheral surface (7de) of the nozzle portion (7d) of the fuel injector (7) as in Modification 5-7 shown in FIG. 7(B).

The filling sealant (26) fills a gap between the inner peripheral surface (10d) of the sleeve (10) and the outer peripheral surface (7de) of the nozzle portion (7d) of the fuel injector (7).

As a material of the filling sealant (26), grease or resin can be used.

The peripheral wall of the sleeve (10) includes an injection hole (10e) into which the filling sealant (26) is injected.

The injection hole (10e) is closed with a plug (10f) after the filling sealant (26) is injected.

When the filling sealant (26) of Modification 5-7 is used, the inner peripheral surface (10d) of the sleeve (10) and the outer peripheral surface (7de) of the nozzle portion (7d) of the fuel injector (7) can be reliably sealed with the filled filling sealant (26).

The outer peripheral side of the sleeve (10) of FIG. 1(A) does not have a sealing means and does not have a sealing function as in the basic example of FIG. 8(A).

However, in order to impart a sealing function to the outer peripheral side of the sleeve (10), as in Modifications 6-1 to 6-3 shown in FIGS. 8(B) to 8(D), a sealing structure using a band member (27) wound in the circumferential direction over the outer peripheral surface (10g) of the sleeve (10) and an outer peripheral surface (12b) of the washer (12) may be used.

In Modification 6-1 shown in FIG. 8(B), a rubber band (27a) is used for the band member (27), in Modification 6-2 shown in FIG. 8(C), a rubber seal (27b) is used for the band member (27), and in Modification 6-3 shown in FIG. 8(D), an adhesive tape (27c) is used for the band member (27).

When the band members (27) of Modifications 6-1 to 6-3 are used, the gap between the outer peripheral surface (10g) of the sleeve (10) and the outer peripheral surface (12b) of the washer (12) can be reliably sealed, and the sealing between the pressing surface (12a) of the washer (12) and the pressure receiving surface (10b) of the sleeve (10) can be strengthened.

In the engine of FIG. 1(A), the outer peripheral side of the washer (12) does not have a waterproof and dustproof means and a waterproof and dustproof function as in the basic example of FIG. 9(A). However, in order to impart a waterproof and dustproof function to the outer peripheral side of the washer (12), a waterproof and dustproof structure in which the washer (12) is covered with a cover (28) from the outer periphery may be used as in Modifications 7-1 and 7-2 shown in FIGS. 9(B) and 9(C).

In Modification 7-1 shown in FIG. 9(B), a sleeve extension cover (28a) extended from the protruding end portion (10a) of the sleeve (10) to the protruding side is used as the cover (28), the washer (12) is covered with the sleeve extension cover (28a) from the outer peripheral side, and the main body portion (7c) of the fuel injector (7) is internally fitted to an extended end (28aa) of the sleeve extension cover (28a).

A space between an inner peripheral surface (28ad) of the extension end portion (28aa) of the sleeve extension cover (28a) and the outer peripheral surface (7cb) of the main body portion (7c) of the fuel injector (7) is sealed with a ring gasket (28ac).

In Modification 7-2 shown in FIG. 9(C), an attachment cover (28b) attached to the fuel injector (7) is used as the cover (28).

The attachment cover (28b) is locked to the main body portion (7c) of the fuel injector (7).

When the sleeve extension cover (28a) and the attachment cover (28b) of Modifications 7-1 and 7-2 shown in FIGS. 9(B) and 9(C) are used, the boundary between the outer peripheral surface (7cb) of the main body portion (7c) of the fuel injector (7) and the outer peripheral surface (12b) of the washer (12) and the boundary between the outer peripheral surface (12b) of the washer (12) and the pressure receiving surface (10b) of the sleeve (10) are covered with the sleeve extension cover (28a) and the attachment cover (28b) from the outer periphery, and ingress of moisture and dust into the sleeve (10) is prevented.

The basic examples and modifications shown in FIGS. 2 to 9 can be freely combined with each other.

FIG. 10(A) is a basic example relating to a combination of the basic examples shown in FIGS. 2 to 9. FIG. 10(B) is Modification 8 relating to a combination in which the elastic end portion (10ab) of Modification 4-4 of FIG. 5(D) and the sleeve extension cover (28a) of Modification 7-1 of FIG. 9(B) are combined. In Modification 8, the sealing structure of the pressure receiving surface of the sleeve in FIGS. 3(B) to 3(D), the structure of such as the pressure receiving surface of the sleeve in FIGS. 4(B) and 4(C), the sealing structure of the pressure receiving surface of the sleeve in FIGS. 5(A) to 5(C), the sealing structure on the inner peripheral side of the sleeve in FIGS. 6(B) to 6(F) and 7(A) and 7(B), and the waterproof and dustproof structure on the outer peripheral side of the washer in FIG. 9(C) may be combined.

Next, the distal end arrangement of the fuel injector (7) will be described.

As shown in FIG. 1(B), the fuel injector (7) includes a fuel injection hole (9) in a distal end surface (7db) of the nozzle portion (7d) facing the vortex chamber (2).

As shown in FIG. 1(A), in this engine, a part of the distal end surface (7db) of the nozzle portion (7d) protrudes into the vortex chamber (2).

In this engine, the entire distal end surface (7db) of the nozzle portion (7d) may protrude into the vortex chamber (2).

In this engine, as shown in FIG. 1(A), since a part or the entirety of the distal end surface (7db) of the nozzle portion (7d) of the fuel injector (7) protrudes into the vortex chamber (2), the combustion flame in the vicinity of the outlet of the fuel injection hole (9) shown in FIGS. 11(A) and 12(A) is easily blown by the swirl flow (2a) shown in FIG. 1(A), and the electronic components of the valve actuator (7ca) in the main body portion (7c) of the fuel injector (7) are hardly overheated by the heat of the combustion flame, so that precise electronic fuel injection control can be performed.

Next, the fuel injection hole (9) of the fuel injector (7) will be described.

Figure 11:
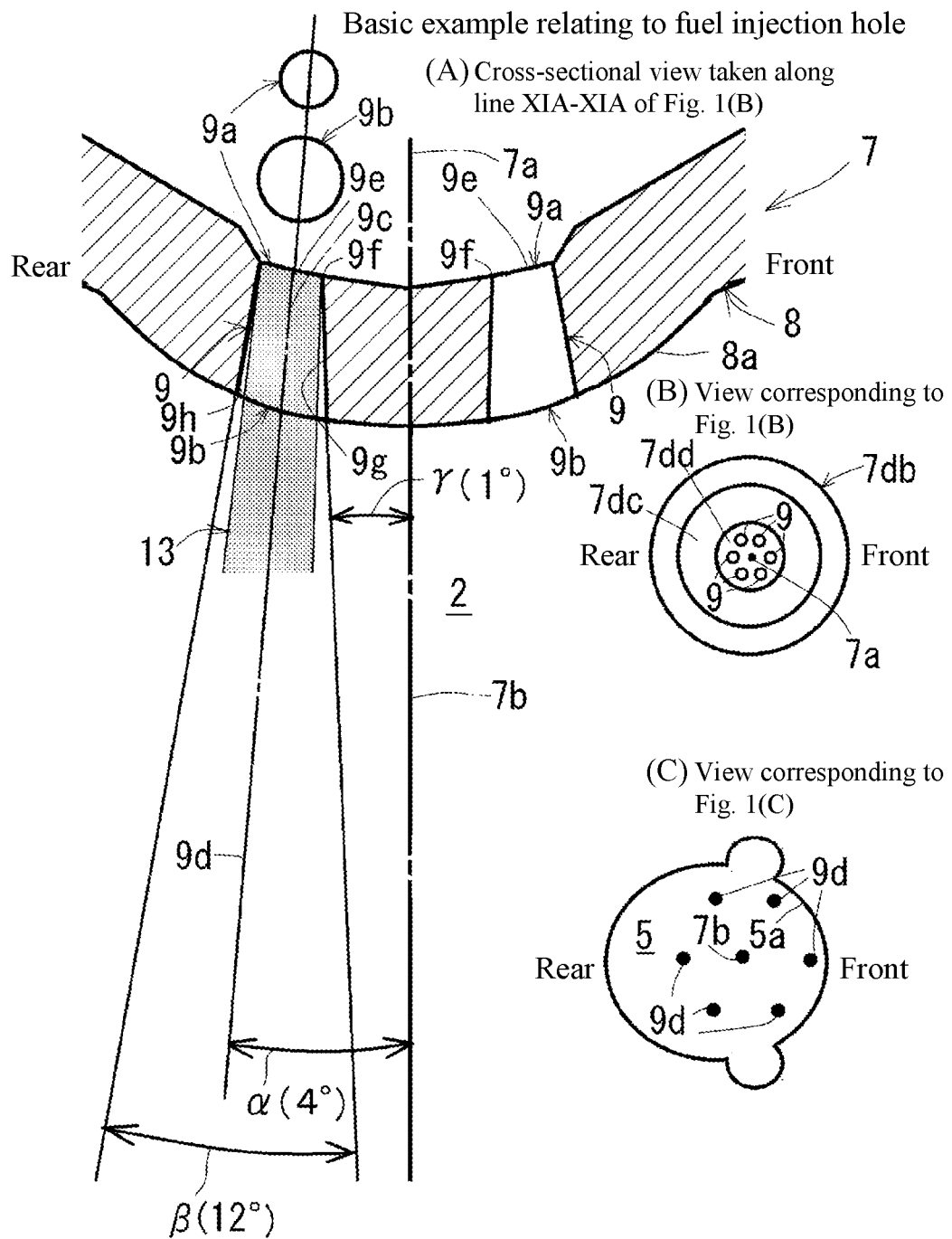
Figure 12:
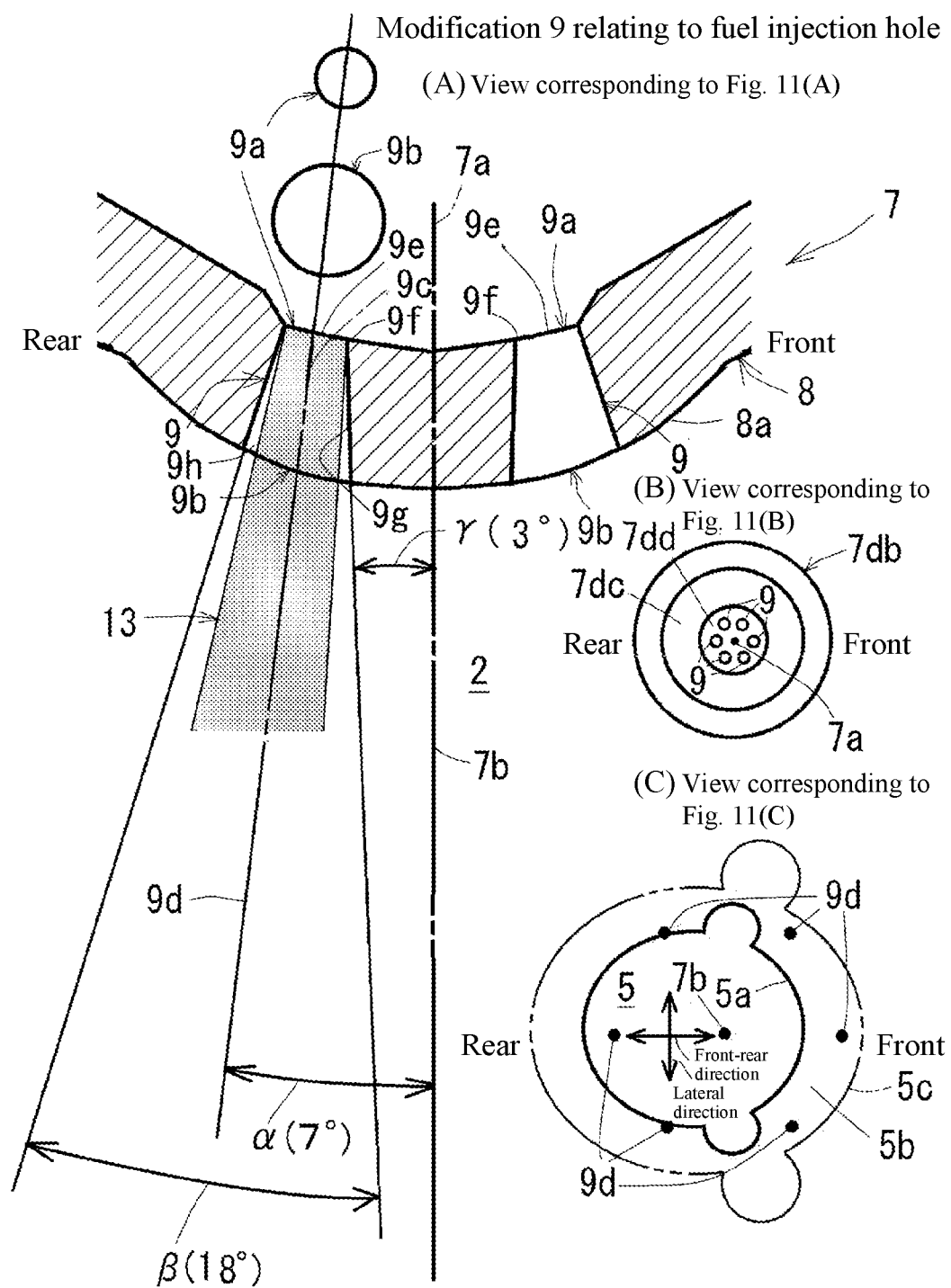

FIG. 11 relates to a basic example of the fuel injection hole (9), and FIG. 12 relates to Modification 9.

As shown in FIGS. 11(A) and 12(A), the fuel injection hole (9) has a forward tapered shape.

In this engine, as shown in FIGS. 11(A) and 12(A), since the fuel injection hole (9) has a forward tapered shape, even if soot accumulates at the outlet of the fuel injection hole (9), the fuel injection is less likely to be hindered, and precise fuel injection control can be performed regardless of the accumulation of soot at the outlet of the fuel injection hole (9) of the fuel injector (7).

Further, in this engine, as shown in FIG. 1(A), since a part or the entirety of the distal end surface (7db) of the nozzle portion (7d) of the fuel injector (7) protrudes into the vortex chamber (2), the combustion gas in the vicinity of the outlet of the fuel injection hole (9) shown in FIGS. 11(A) and 12(A) is easily blown by the swirl flow (2a) shown in FIG. 1(A), and soot in the combustion gas hardly grows at the outlet of the fuel injection hole (9).

As shown in FIGS. 1(A) and (B), the distal end surface (7db) of the nozzle portion (7d) of the fuel injector (7) is provided with a flat vortex guide surface (7dc) around the fuel injection hole (9).

As shown in FIG. 1(A), the entire vortex guide surface (7dc) protrudes into the vortex chamber (2).

In this engine, a part of the vortex guide surface (7dc) may protrude into the vortex chamber (2).

As shown in FIG. 1(A), in this engine, since at least a part of the vortex guide surface (7dc) protrudes into the vortex chamber (2), the swirl flow (2a) swirling in the vortex chamber (2) is guided by the vortex guide surface (7dc), the swirl flow (2a) swirls smoothly in the vortex chamber (2), mixing of the compressed air and the injected fuel (13) is improved, and soot is less likely to be generated in the vortex chamber (2).

The fuel injection hole (9) is formed in a most distal end surface (7dd) having a protruding spherical surface shape at the center of the distal end surface (7db) of the nozzle portion (7d).

As shown in FIGS. 1(B), 11(B), and 12(B), this engine includes a plurality of fuel injection holes (9) per fuel injector (7).

Therefore, the injected fuel (13) shown in 11(B) and 12(B) is widely dispersed in the vortex chamber (2), mixing of the compressed air and the injected fuel (13) is improved, and soot is less likely to be generated in the vortex chamber (2).

As shown in FIGS. 1(B), 11(B), and 12(B), six fuel injection holes (9) are provided per fuel injector (7).

In this engine, it is desirable to provide two to six fuel injection holes (9) per fuel injector (7).

In the basic example of the fuel injection hole (9) shown in FIGS. 1(B), 11(A), and 11(B), a total opening area of six inlet openings (9a) of the fuel injection holes (9) of one fuel injector (7) is set to A square mm, a displacement for one cylinder is set to C cubic mm, and a value of A/C obtained by dividing the former value A by the latter value C is set to $0.75 \times 10^{-6}$. Specifically, the total opening area A of the six inlet openings (9a) of the fuel injection holes (9) was set to 0.224 square mm, and the displacement C for one cylinder was set to 299000 cubic mm. The same applies to Modification 9 of the fuel injection hole (9) shown in FIG. 12.

In this engine, it is desirable that the value of A/C be $0.5 \times 10^{-6}$ to $1.0 \times 10^{-6}$.

When the value of A/C is less than $0.5 \times 10^{-6}$, the total opening area A of the inlet openings (9a) of the fuel injection holes (9) is insufficient, and a necessary output may not be obtained. When the value of A/C exceeds $1.0 \times 10^{-6}$, the total opening area A of the inlet openings (9a) of the fuel injection holes (9) becomes excessively large, the fuel injection speed is slow, the oil droplets of the injected fuel (13) are not refined in the vortex chamber (2), the mixing of the compressed air and the injected fuel becomes poor, and soot is likely to be generated in the vortex chamber (2).

On the other hand, when the value of A/C is $0.5 \times 10^{-6}$ to $1.0 \times 10^{-6}$, a necessary output is obtained, and soot is less likely to be generated in the vortex chamber (2).

In the basic example of the fuel injection hole (9) shown in FIG. 11(A), a total opening area of six outlet openings (9b) of the fuel injection holes (9) of one fuel injector (7) is set to B square mm, a total opening area of six inlet openings (9a) of the fuel injection holes (9) of one fuel injector (7) is set to A square mm, and a value of B/A obtained by dividing the former value B by the latter value A is set to 1.26.

Specifically, the total opening area A of the six inlet openings (9a) of the fuel injection holes (9) was set to 0.224 square mm, and the total opening area B of the six outlet openings (9b) of the fuel injection holes (9) was set to 0.282 square mm as described above. In Modification 9 of the fuel injection hole (9) shown in FIG. 12(A), the value of B/A is slightly larger than 1.26.

In this engine, it is desirable that the value of B/A be 1.08 to 1.44.

When the value of B/A is less than 1.08, the total opening area B of the outlet openings (9b) is too small with respect to the total opening area A of the inlet openings (9a) of the fuel injection holes (9), the fuel injection is hindered by a small amount of soot deposited at the outlet of the fuel injection hole (9), and the accuracy of the fuel injection control may be deteriorated.

When the value of B/A exceeds 1.44, the total opening area B of the outlet openings (9b) is too large with respect to the total opening area A of the inlet openings (9a) of the fuel injection holes (9), the growth rate of the soot deposits at the outlet of the fuel injection hole (9) is high, the fuel injection is hindered by a large amount of soot deposits, and the accuracy of the fuel injection control may be deteriorated.

On the other hand, when the value of B/A is 1.08 to 1.44, the fuel injection is not hindered by a small amount of soot deposits, the growth rate of the soot deposits at the outlet of the fuel injection hole (9) is slow, and the accuracy of the fuel injection control is unlikely to deteriorate.

When the value of B/A exceeds 1.44, the growth rate of the soot deposits at the outlet of the fuel injection hole (9) increases, whereas when the value of B/A is 1.44 or less, the growth rate decreases. The reason for this is estimated as follows. That is, it is estimated that in the former case, a gap (9h) formed around the injected fuel (13) at the outlet of the fuel injection hole (9) becomes excessive, a large amount of combustion gas containing soot flows into the gap (9h), and soot deposits grow rapidly, whereas in the latter case, the gap (9h) formed around the injected fuel (13) at the outlet of the fuel injection hole (9) has an appropriate size, the growth rate of the soot deposits and the removal rate of the soot deposits by the injected fuel (13) are antagonized, and the soot deposits grown at the outlet of the fuel injection hole (9) are immediately removed by the injected fuel.

As shown in FIG. 2(C), in this engine, a vortex chamber-side extension line (7b) of an injector central axis line (7a) passes through the communication port (5). As shown in FIG. 11(B), the plurality of (six) fuel injection holes (9) are arranged around the injector central axis line (7a). As shown in FIG. 11(C), all of (six) vortex chamber-side extension lines (9d) of injection hole central axis lines (9c) of the plurality of (six) fuel injection holes (9) pass through the communication port (5).

In this engine, only some of the total number (six) of the vortex chamber-side extension lines (9d) may pass through the communication port (5).

In this engine, since a large amount of the injected fuel (13) is injected into the main combustion chamber (4) via the communication port (5), excessive combustion in the vortex chamber (2) is prevented, and soot is less likely to be generated in the vortex chamber (2).

The plurality of (six) fuel injection holes (9) are arranged around the injector central axis line (7a) at regular intervals in a circumferential direction of a distal-most protruding surface (8a) of an injector distal end surface (8).

In the fuel injection hole (9) of Modification 9 shown in FIG. 12, as shown in FIG. 12(C), the vortex chamber-side extension line (7b) of the injector central axis line (7a) passes through the communication port (5). As shown in FIG. 12(B), the plurality of (six) fuel injection holes (9) of each fuel injector (7) are arranged around the injector central axis line (7a). As shown in FIG. 12(C), some (five) of the vortex chamber-side extension lines (9d) of the injection hole central axis lines (9c) of the plurality of (six) fuel injection holes (9) of each fuel injector (7) abut on the peripheral edge portion (5b) of the vortex chamber-side opening (5a) of the communication port (5). The remaining number (one) penetrates the communication port (5).

In this engine, the entire number (six) may abut on the peripheral edge portion (5b) of the vortex chamber-side opening (5a) of the communication port (5).

In this engine, since a large amount of the injected fuel (13) is injected into the main combustion chamber (4) via the communication port (5), excessive combustion in the vortex chamber (2) is prevented, and soot is less likely to be generated in the vortex chamber (2).

As shown in FIG. 12(C), in the fuel injection hole (9) of Modification 9, when viewed in a direction parallel to the vortex chamber-side extension line (7b) of the injector central axis line (7a), a similar shape virtual line (5c) similar in shape to the vortex chamber-side opening (5a) in which the dimensions in the front-rear direction and the lateral direction orthogonal to each other are enlarged by 1.5 times is assumed, and the vortex chamber inner peripheral surface between the similar shape virtual line (5c) and the vortex chamber-side opening (5a) is the peripheral edge portion (5b) of the vortex chamber-side opening (5a) on which the vortex chamber-side extension line (9d) of the injection hole central axis line (9c) of the fuel injection hole (9) abuts.

In Modification 9 of the fuel injection hole (9) shown in FIG. 12, the same elements as those of the basic example of the fuel injection hole (9) shown in FIG. 11 are denoted by the same reference numerals as those in FIG. 11. The elements of the modification of the fuel injection hole (9) shown in FIG. 12 have the same structure and function as the elements of the basic example of the fuel injection hole (9) shown in FIG. 11 unless otherwise specified.

As a result of examining the generation status of soot in the vortex chamber (2), in the basic example of FIG. 11 in which all (six) of the vortex chamber-side extension lines (9d) of the injection hole central axis lines (9c) of the plurality of (six) fuel injection holes (9) pass through the communication port (5) and Modification 9 of FIG. 12 in which some (five) abut on the peripheral edge portion (5b) of the vortex chamber-side opening (5a) of the communication port (5), the generation amount of soot in the vortex chamber (2) was smaller than that in the third comparative example of FIG. 15(C) in which all (six) abut against the outside of the peripheral edge portion (105b) of the vortex chamber-side opening (105a).

In the third comparative example shown in FIG. 15, the same elements as those in the basic example shown in FIG. 11 and the modification shown in FIG. 12 are denoted by reference numerals obtained by adding 100 to the reference numerals in FIGS. 11 and 12. The same applies to the first comparative example shown in FIG. 13 and the second comparative example shown in FIG. 14.

As shown in FIG. 11(A), in the basic example of the fuel injection hole (9), the expansion angle ($\alpha$) of each injection hole central axis line (9c) (or its vortex chamber-side extension line (9d)) with respect to the injector central axis line (7a) is 4°.

As shown in FIG. 12(A), in Modification 9 of the fuel injection hole (9), the expansion angle ($\alpha$) of each injection hole central axis line (9c) (or its vortex chamber-side extension line (9d)) with respect to the injector central axis line (7a) is 7°.

In this engine, the expansion angle ($\alpha$) of each injection hole central axis line (9c) (or its vortex chamber-side extension line (9d)) with respect to the injector central axis line (7a) is desirably set to 4° to 7°.

When the expansion angle ($\alpha$) is less than 4°, some of the plurality of injected fuels (13) easily overlap each other, and soot is easily generated in the vortex chamber (2).

When the expansion angle ($\alpha$) exceeds 7°, most of the injected fuel (13) collides with the inner surface of the vortex chamber (2) without passing through the communication port (5), and soot is likely to be generated due to excessive combustion in the vortex chamber (2).

On the other hand, when the expansion angle ($\alpha$) is 4° to 7°, soot is less likely to be generated in the vortex chamber (2).

As a result of examining the generation situation of soot in the vortex chamber (2), in the basic example (FIG. 11) in which the expansion angle ($\alpha$) was 4° and Modification 9 (FIG. 12) in which the expansion angle ($\alpha$) was 7°, the generation of soot in the vortex chamber (2) was smaller than that in the first comparative example (FIG. 13) in which the expansion angle ($\alpha$) was 0°, the second comparative example (FIG. 14) in which the expansion angle ($\alpha$) was 10, and the third comparative example (FIG. 15) in which the expansion angle ($\alpha$) was 10°.

In the fuel injection hole (9) of the basic example shown in FIG. 11(A), the taper angle ($\beta$) of each fuel injection hole (9) is 12°.

In Modification 9 of the fuel injection hole (9) shown in FIG. 12(A), the taper angle ($\beta$) of each fuel injection hole (9) is 18°.

In this engine, the taper angle ($\beta$) is desirably set to 120 to 18°.

When the taper angle ($\beta$) is less than 12°, the outlet opening (9b) is too small with respect to the inlet opening (9a) of the fuel injection hole (9), the fuel injection is hindered by a small amount of soot deposited at the outlet of the fuel injection hole (9), and the accuracy of the fuel injection control may be deteriorated.

When the taper angle ($\beta$) exceeds 18°, the outlet opening (9b) is too large with respect to the inlet opening (9a) of the fuel injection hole (9), the growth rate of the soot deposits is high at the outlet of the fuel injection hole (9), the fuel injection is hindered by a large amount of soot deposits, and the accuracy of the fuel injection control may be deteriorated.

On the other hand, when the taper angle ($\beta$) is 12° to 18°, the fuel injection is not hindered by a small amount of soot deposits, the growth rate of the soot deposits at the outlet of the fuel injection hole (9) is slow, and the accuracy of the fuel injection control is unlikely to deteriorate.

As a result of examining the growth rate of soot deposits at the outlet of the fuel injection hole (9), in the basic example (FIG. 11) in which the taper angle (β) was 120 and Modification 9 (FIG. 12) in which the taper angle (β) was 18°, the growth rate of the soot deposits at the outlet of the fuel injection hole (9) was lower than that in the first comparative example (FIG. 13) in which the taper angle (β) was 0°, the second comparative example (FIG. 14) in which the taper angle (β) was 6°, and the third comparative example (FIG. 15) in which the taper angle (β) was 24°.

The reason why, as in the third comparative example of FIG. 15, when the taper angle (β) exceeds 18°, the growth rate of the soot deposits increases at an outlet of a fuel injection hole (109), whereas, as in the basic example of FIG. 11 and Modification 9 of FIG. 12, when the taper angle (β) is 180 or less, the growth rate decreases is estimated as follows. That is, it is estimated that in the former case, a relatively large gap (109h) is formed around the injected fuel (113) at the outlet of the fuel injection hole (109), a large amount of combustion gas containing soot flows into the large gap (109h), and the soot deposits rapidly grow, whereas in the latter case, the gap (9h) around the injected fuel (13) becomes an appropriate size at the outlet of the fuel injection hole (9), the growth rate of the soot deposits and the removal rate of the soot deposits by the injected fuel (13) are antagonized, and the soot deposits grown at the outlet of the fuel injection hole (9) are immediately removed by the injected fuel.

As shown in FIG. 11(A), in the basic example of the fuel injection hole (9), the included angle (γ) between the injector central axis line (7a) and each injection hole inner peripheral surface (9g) along the injector central axis line (7a) is 1°.

As shown in FIG. 12(A), in Modification 9 of the fuel injection hole (9), the included angle (γ) between the injector central axis line (7a) and each injection hole inner peripheral surface (9g) along the injector central axis line (7a) is 3°.

In this engine, the included angle (γ) is desirably set to 10 to 3°.

When the included angle (γ) is less than 1°, some of the plurality of injected fuels (13) easily overlap each other, and soot is easily generated in the vortex chamber (2). When the expansion angle (α) exceeds 3°, most of the injected fuel (13) collides with the inner surface of the vortex chamber (2) without passing through the communication port (5), and soot is likely to be generated due to excessive combustion in the vortex chamber (2).

On the other hand, when the included angle (γ) is 1° to 3°, soot is less likely to be generated in the vortex chamber (2).

As a result of examining the generation status of soot in the vortex chamber (2), in the basic example (FIG. 11) in which the included angle (γ) is 10 and Modification 9 (FIG. 12) in which the included angle (γ) is 3°, the generation amount of soot in the vortex chamber (2) was smaller than that in the first comparative example (FIG. 13) in which the included angle (γ) is 0° and the comparative example (not shown) in which the included angle (γ) is 4°.

As shown in FIG. 11(A), in the basic example of the fuel injection hole (9), an inlet opening edge (9e) of the fuel injection hole (9) has a sharp pin angle (9f) that is not chamfered.

Also in Modification 9 of the fuel injection hole (9) shown in FIG. 12(A), the inlet opening edge (9e) of the fuel injection hole (9) has the sharp pin angle (9f) that is not chamfered.

In this engine, the inlet opening edge (9e) of the fuel injection hole (9) leaves the sharp pin angle (9f) that is not chamfered, thereby eliminating the need for chamfering and facilitating fabrication of the fuel injector (7).

In addition, in this engine, since the fuel injector (7) injects fuel into the vortex chamber (2), the fuel injection pressure may be lower than that of the direct injection type, wear of the pin angle (9f) due to the fuel injection pressure is less likely to occur, and deterioration in fuel injection accuracy due to this is less likely to occur.

The pin angle (9f) is an opening edge having a sharp shape with R of 0.1 mm or less.

DESCRIPTION OF REFERENCE SIGNS (1): Cylinder head
(1a): Insertion hole
(1b): Engine cooling air passage
(2): Vortex chamber
(3): Cylinder
(4): Main combustion chamber
(5): Communication port
(6): Insertion hole
(7): Fuel injector
(7c): Main body portion
(7ca): Valve actuator
(7cb): Outer peripheral surface
(7d): Nozzle portion
(7da): Valve body
(7db): Distal end surface
(7dc): Vortex guide surface
(10): Sleeve
(10a): Protruding end portion
(10b): Pressure receiving surface
(11): Pressing force
(12): Washer
(12a): Pressing surface
(17): Adhesive
(18): Grease
(19): Seat gasket
(20): Groove

The invention claimed is:
1. An electronic fuel injection type diesel engine including a cylinder, a cylinder head, a vortex chamber in the cylinder head, a main combustion chamber in the cylinder, a communication port for communicating the main combustion chamber and the vortex chamber, an insertion hole in the cylinder head toward the vortex chamber, and an electronic fuel injection type fuel injector inserted into the insertion hole, the electronic fuel injection type diesel engine comprising:
 a sleeve protruding from the insertion hole to an outside of the cylinder head; and
 a pressure receiving surface provided at a protruding end portion of the sleeve,
 wherein the fuel injector includes a main body portion having a large diameter, a nozzle portion having a small diameter, and a pressing surface formed at a step portion between the main body portion and the nozzle portion, and
 wherein the nozzle portion of the fuel injector is inserted from an inside of the sleeve to an inside of the insertion hole, the fuel injector is pressed toward the vortex chamber by a pressing force, and the pressing force applied to the fuel injector is received by the pressure receiving surface of the sleeve from the pressing surface of the fuel injector via a washer.

2. The electronic fuel injection type diesel engine according to claim 1, wherein a valve body is housed in the nozzle portion of the fuel injector, and an electronic component of a valve actuator of the valve body is housed in the main body portion of the fuel injector.

3. The electronic fuel injection type diesel engine according to claim 1, further comprising an engine cooling air passage,
wherein an outer peripheral surface of the main body portion of the fuel injector and an outer peripheral surface of the sleeve are exposed in the engine cooling air passage.

4. The electronic fuel injection type diesel engine according to claim 1, wherein the sleeve is configured as a component separate from the cylinder head and is attached to the cylinder head.

5. The electronic fuel injection type diesel engine according to claim 1, wherein a space between a pressing surface of the washer and the pressure receiving surface of the sleeve is sealed with an adhesive.

6. The electronic fuel injection type diesel engine according to claim 1, wherein a space between a pressing surface of the washer and the pressure receiving surface of the sleeve is sealed with grease.

7. The electronic fuel injection type diesel engine according to claim 1, wherein a space between a pressing surface of the washer and the pressure receiving surface of the sleeve is sealed with a seat gasket.

8. The diesel engine according to claim 1, wherein a concentric circular or spiral groove extending in a circumferential direction is formed in one or both of the pressure receiving surface of the sleeve and a pressing surface of the washer.

9. The electronic fuel injection type diesel engine according to claim 1,
wherein a fuel injection hole is provided in a distal end surface of the nozzle portion facing the vortex chamber, and
wherein a part or an entirety of the distal end surface of the nozzle portion protrudes into the vortex chamber.

10. The electronic fuel injection type diesel engine according to claim 2, further comprising an engine cooling air passage,
wherein an outer peripheral surface of the main body portion of the fuel injector and an outer peripheral surface of the sleeve are exposed in the engine cooling air passage.

11. The electronic fuel injection type diesel engine according to claim 2, wherein the sleeve is configured as a component separate from the cylinder head and is attached to the cylinder head.

12. The electronic fuel injection type diesel engine according to claim 2, wherein a space between a pressing surface of the washer and the pressure receiving surface of the sleeve is sealed with an adhesive.

13. The electronic fuel injection type diesel engine according to claim 2, wherein a space between a pressing surface of the washer and the pressure receiving surface of the sleeve is sealed with grease.

14. The electronic fuel injection type diesel engine according to claim 2, wherein a space between a pressing surface of the washer and the pressure receiving surface of the sleeve is sealed with a seat gasket.

15. The diesel engine according to claim 2, wherein a concentric circular or spiral groove extending in a circumferential direction is formed in one or both of the pressure receiving surface of the sleeve and a pressing surface of the washer.

16. The electronic fuel injection type diesel engine according to claim 2,
wherein a fuel injection hole is provided in a distal end surface of the nozzle portion facing the vortex chamber, and
wherein a part or an entirety of the distal end surface of the nozzle portion protrudes into the vortex chamber.

17. The electronic fuel injection type diesel engine according to claim 3, wherein the sleeve is configured as a component separate from the cylinder head and is attached to the cylinder head.

18. The electronic fuel injection type diesel engine according to claim 3, wherein a space between a pressing surface of the washer and the pressure receiving surface of the sleeve is sealed with an adhesive.

19. The electronic fuel injection type diesel engine according to claim 3, wherein a space between a pressing surface of the washer and the pressure receiving surface of the sleeve is sealed with grease.

20. The electronic fuel injection type diesel engine according to claim 3, wherein a space between a pressing surface of the washer and the pressure receiving surface of the sleeve is sealed with a seat gasket.

* * * * *